(12) United States Patent
Pickering

(10) Patent No.: US 6,628,083 B2
(45) Date of Patent: Sep. 30, 2003

(54) CENTRAL BATTERY EMERGENCY LIGHTING SYSTEM

(75) Inventor: Charles L. Pickering, Waverly, WV (US)

(73) Assignee: Pickering Associates, Inc., Parkersburg, WV (US)

( * ) Notice: Subject to any disclaimer, the term of this patent is extended or adjusted under 35 U.S.C. 154(b) by 0 days.

(21) Appl. No.: 09/844,430

(22) Filed: Apr. 30, 2001

(65) Prior Publication Data

US 2002/0047627 A1 Apr. 25, 2002

Related U.S. Application Data

(60) Provisional application No. 60/200,506, filed on Apr. 28, 2000.

(51) Int. Cl.$^7$ .............................................. H05B 41/14
(52) U.S. Cl. ...................... 315/86; 315/160; 315/161; 315/362
(58) Field of Search .......................... 315/88, 86, 160, 315/200 R, 225, 226, 209 R, 312, 313, 314, 315, 360, 161, 87, 362

(56) References Cited

U.S. PATENT DOCUMENTS

| | | | |
|---|---|---|---|
| 3,660,714 A | 5/1972 | Chandler | 315/86 |
| 3,869,639 A | 3/1975 | Herzog | 315/86 |
| 3,906,243 A | 9/1975 | Herzog | 307/66 |
| 4,682,078 A * | 7/1987 | Pascalide | 307/64 |
| 4,751,398 A | 6/1988 | Ertz, III | 307/66 |
| 4,977,351 A | 12/1990 | Bavaro et al. | 315/87 |
| 5,149,185 A | 9/1992 | Mandy | 362/20 |
| 5,233,271 A | 8/1993 | Huang et al. | 315/86 |
| 5,365,145 A | 11/1994 | Fields | 315/86 |
| 5,646,502 A | 7/1997 | Johnson | 320/5 |
| 5,834,858 A | 11/1998 | Crosman, III et al. | 307/66 |
| 5,859,499 A | 1/1999 | McAfee et al. | 315/86 |
| 5,955,843 A | 9/1999 | Nuckolls et al. | 315/86 |
| 5,986,407 A | 11/1999 | Chang | 315/86 |
| 6,045,232 A * | 4/2000 | Buckmaster | 307/66 |
| 6,049,178 A | 4/2000 | Sheu et al. | 315/291 |
| 6,339,296 B1 * | 1/2002 | Goral | 315/209 T |

* cited by examiner

*Primary Examiner*—Don Wong
*Assistant Examiner*—Thuy Vinh Tran
(74) *Attorney, Agent, or Firm*—Nixon Peabody LLP; Jeffrey L. Costellia

(57) ABSTRACT

An integral emergency lighting system which utilizes the same branch circuit wiring as main alternating current (AC) power to selectively supply emergency power to light fixtures during an emergency condition such as during an interruption or unavailability of main power from the AC source. The system includes line detection circuitry at the lighting fixtures to enable switching from main AC operation to emergency DC power and also the energizing of the associated egress lighting regardless of the on/off switch settings connected to the branch circuitry. Upon the restoration of main power, the DC battery source automatically switches off and a built-in time delay circuit allows line detection circuitry to stabilize into AC input condition before AC power re-energizes the branch circuit (i.e., switches into the main power mode).

24 Claims, 5 Drawing Sheets

CENTRAL BATTERY EMERGENCY LIGHTING SYSTEM

CROSS-REFERENCE TO RELATED APPLICATION

This application claims benefit to provisional Application Ser. No. 60/200,506, filed Apr. 28, 2000.

BACKGROUND OF THE INVENTION

1. Field of the Invention

The present invention is directed generally to an emergency lighting system for supplying emergency power to a lighting device. More particularly, the present invention is directed to an emergency lighting system which selectively energizes a lighting device upon the occurrence of a power interruption and includes a branch circuit relay at the lighting panel comprising a plurality of relays for directing alternating current (AC) power to the branch circuit during normal operation, and direct current (DC) power to the branch circuit during emergency power operations. In addition, the system includes a time delay circuit in which, upon restoration of AC power to the branch circuit, allows line detection circuitry to stabilize before switching from an emergency mode to the normal mode.

2. Description of Related Art

Emergency lighting is utilized in buildings to provide light for egress and to direct occupants toward the exits in case of a loss of main power to a building. In related art systems, this is generally accomplished by installing exit and emergency lighting fixtures having self-contained batteries or battery powered inverters mounted internal to fluorescent lighting fixtures within these buildings. The self-contained exit and emergency lighting fixtures utilize small batteries which are kept charged in case of main power failure. In the case of the loss of main alternating current (AC) power, the self-contained exit fixture switches power from the lamps within the unit (which function off of main AC power) to a set of direct current (DC) powered lamps which are powered by an internal battery within the exit fixture. In a situation resulting in the loss of main AC power, the self-contained emergency light senses the loss of power and, in response thereto, energizes a set of DC powered lamps from the internal battery within the emergency light fixture. Internal battery powered inverters mounted within fluorescent fixtures operate similarly to self-contained batteries in that they also operate to sense a loss of main power and ignite and hold selected fluorescent lamps in response thereto.

There are several disadvantages to having these many independent battery operated fixtures throughout the buildings. For instance, because the emergency components operate in a very hostile environment as a result of being mounted within the fixture, they expose the batteries to undue heat. In addition, over time, because the batteries are maintained at a constant charge, they deteriorate in their ability to provide the rated output required by code to allow safe egress from the building in which they are installed. Furthermore, the required maintenance and testing of the fixtures is commonly ignored, and thus, the safety of the system is compromised. Additionally, leakage from the batteries commonly results in damage to both the fixtures and the surrounding environment.

Larger buildings are generally provided with emergency lighting devices which utilize central battery systems for powering exit and emergency fixtures. The central battery system is advantageous in that it can keep the batteries maintained at full charge, monitor the lifetime of the batteries, provide a single location for maintenance, and be equipped to alarm the building in the event of a sensed abnormal condition. The central battery system is disadvantageous in that it utilizes separate wiring for the main AC system and the emergency DC system. This redundancy adds obvious additional cost to new installations which may also be inconvenient to install. In addition, central battery systems are usually not an option for existing buildings which require the installation of a new emergency lighting system, and thus, requires the installation of new conduit and wiring dedicated to the emergency lighting system, which is often impractical due to costs or esthetic reasons.

SUMMARY OF THE INVENTION

In view of the foregoing, it is an object of the present invention to overcome obviate the disadvantages in the related art in providing an emergency lighting system which detects a power interruption in the main lighting system.

It is a second object of the present invention to provide an emergency lighting system which controls the operation of main and emergency lighting fixtures within a building or structure.

It is a third object of the present invention to provide an emergency lighting system which utilizes existing wiring for controlling the operation of main and emergency lighting fixtures.

It is a fourth object of the present invention to provide an emergency lighting system which automatically switches from the AC power source to a DC power source upon the detection of a power interruption in the main power source regardless of an on/off switch position of the light branch circuit.

It is a fifth object of the present invention to provide an emergency lighting system which stabilizes the lighting circuitry upon switching from emergency power to main power.

These and other objects are achieved in the present invention by providing an central battery emergency lighting system that allows the sharing of the main AC branch circuit wiring for both the main and emergency power distribution within a building or structure. The sharing of the branch circuit wiring is accomplished by introducing a branch circuit relay at the lighting panel connected to a DC central battery system. Accordingly, during circumstances in which the main AC voltage is not present due to an interruption in power (i.e., an outage or shortage), a line detection circuit detects the loss of the AC voltage and the branch circuit relay switches the line to thereby provide a source of emergency power to the branch circuit from the voltage from the DC central battery system. Additionally, line detection circuits are provided in the lighting fixtures for actuating and operating an emergency lamp. Upon detecting the loss of AC voltage, the line detection circuit automatically switches power to a dedicated emergency lamp within the lighting fixture. Upon the restoration of main power, the lighting fixture resets to the AC voltage lamps to allow the resumption of normal operations.

The central battery emergency lighting system also includes switch sensing to allow DC power to be transmitted to an emergency fixture regardless of the position of the main AC lighting switch position. The switch sensing allows for the main AC wiring of the lighting system with appropriate light switches within the building, and bypasses the switches during emergency DC operation regardless of the switch position. In addition, the system utilizes an automatic time delay circuit for delaying re-energizing the line with AC power to allow stabilization of the switch circuits between emergency and normal modes.

In accordance with an embodiment of the invention, the line detection circuits are installed in predetermined locations, and preferably, are located within any type of normal lighting fixture. For example, fluorescent lay-in lighting fixtures are equipped with a line detection circuit mounted within or adjacent to the ballast chamber to thereby direct main AC power to the fluorescent ballast and emergency backup power to the dedicated emergency lamps. In addition, the line detection circuits will actuate and hold the lamp in an emergency operation mode. For recessed incandescent lamps, the line detection circuits are modified for mounting within a junction box adjacent to the light fixture to direct the main AC power to the light fixture and the emergency DC power to an appropriate local emergency lighting fixture. Exit fixtures equipped with both AC and DC powered lamps may also be provided with a line detection circuit for directing power to the appropriate lamps.

BRIEF DESCRIPTION OF THE DRAWINGS

A complete understanding of the invention is obtained from the following descriptions whereby the objects and advantages of this invention become more apparent and readily appreciated from the following detailed description taken in conjunction with the accompanying drawings demonstrating the exemplary embodiments of the invention, of which.

DETAILED DESCRIPTION OF THE PREFERRED EMBODIMENTS

Figure 1A:
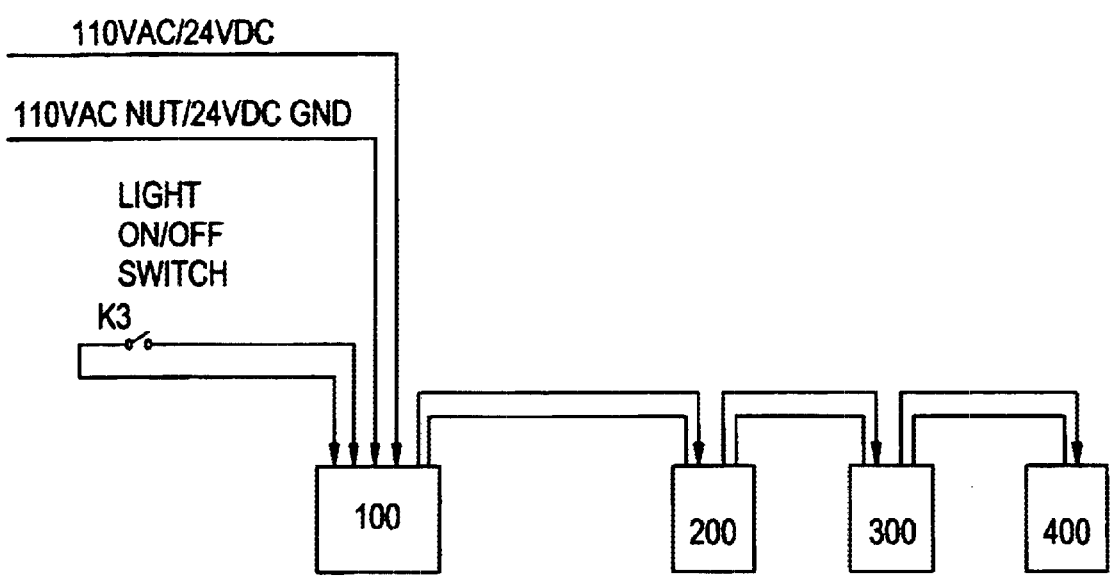
FIG. 1a is a block diagram of an exemplary embodiment of the invention wired into a typical lighting branch circuit.
Figure 1B:
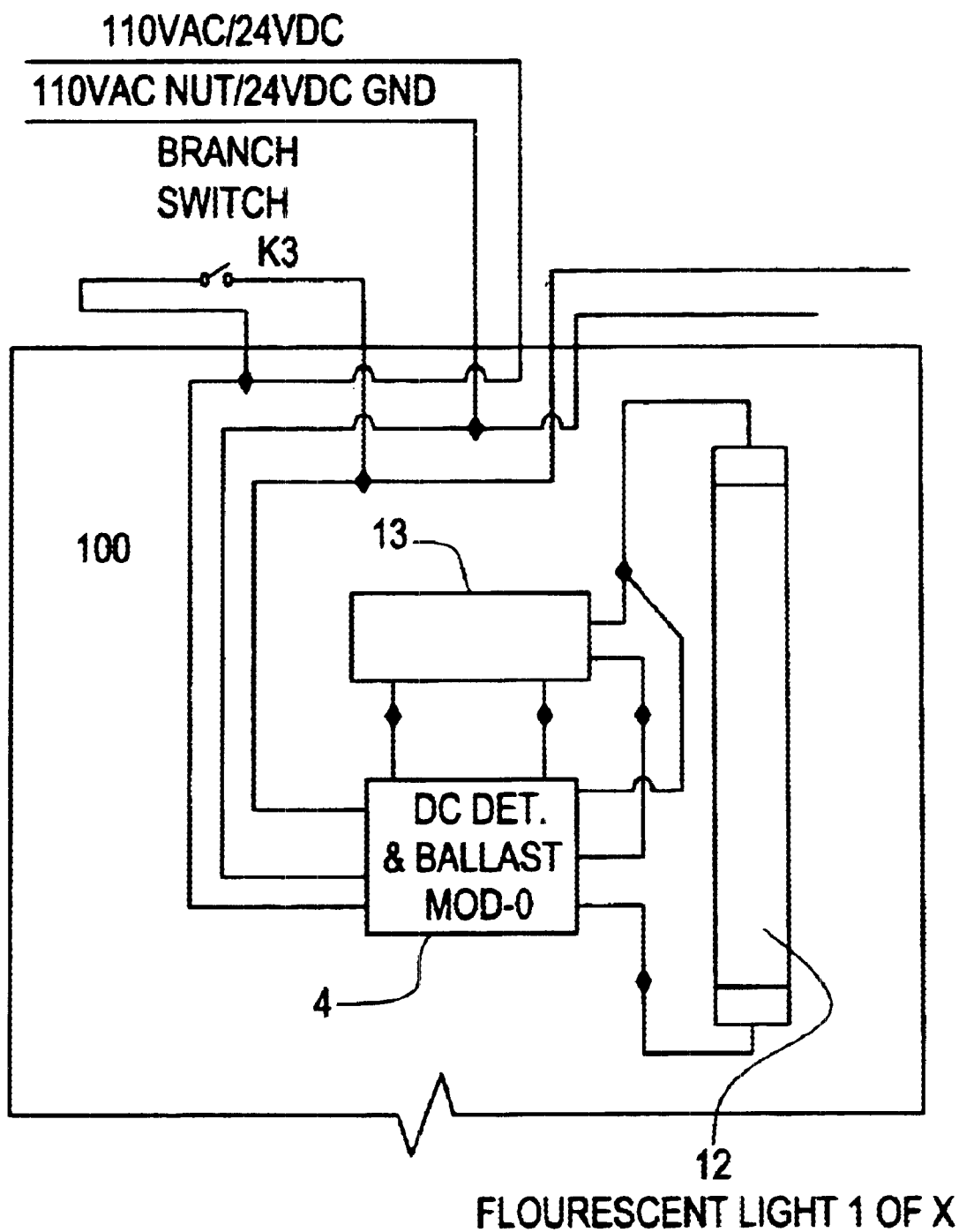
FIGS. 1b and 1c are circuit diagrams illustrating an emergency lighting branch circuit according to second and third embodiments of the present invention.
Figure 1C:
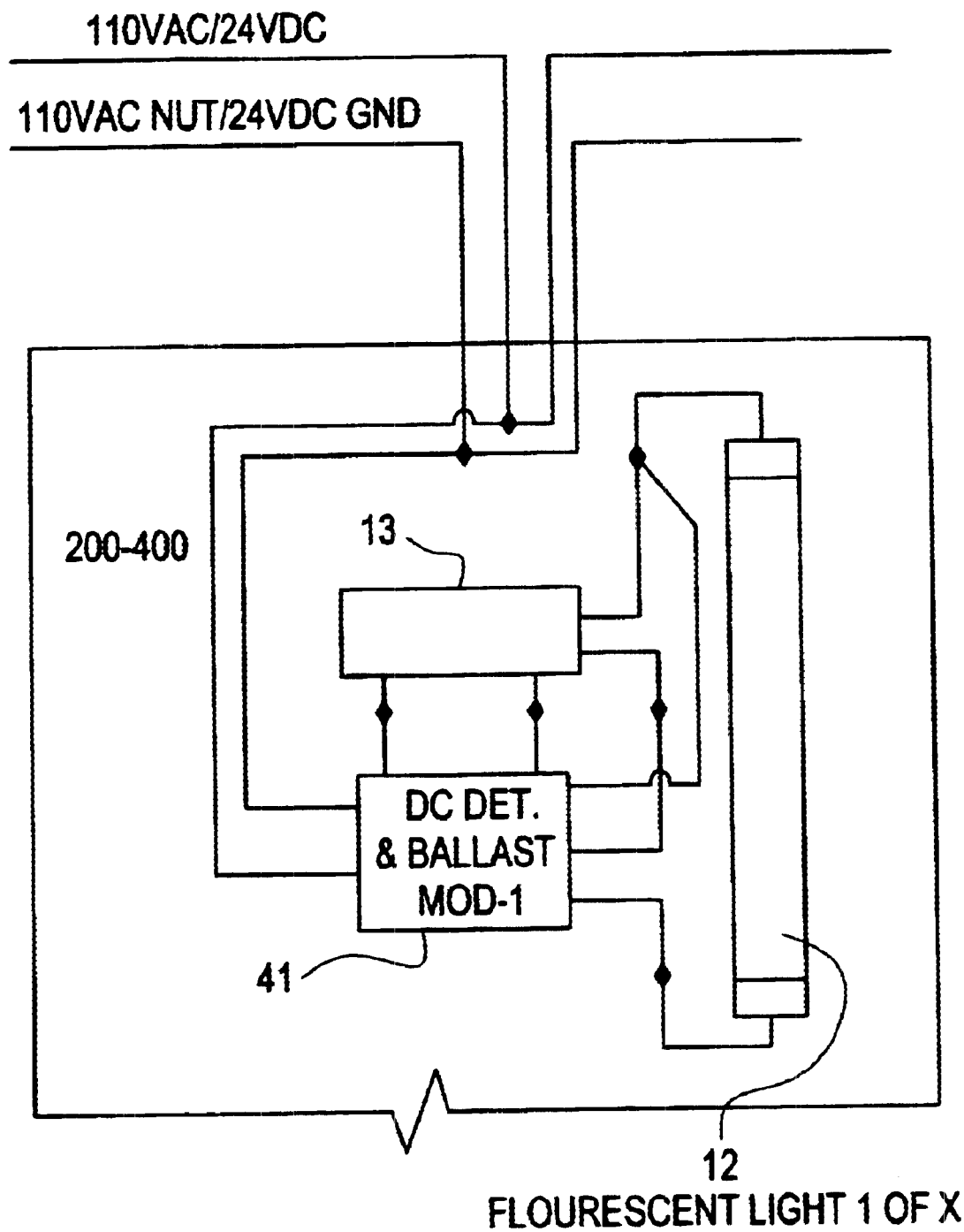
Figure 3:
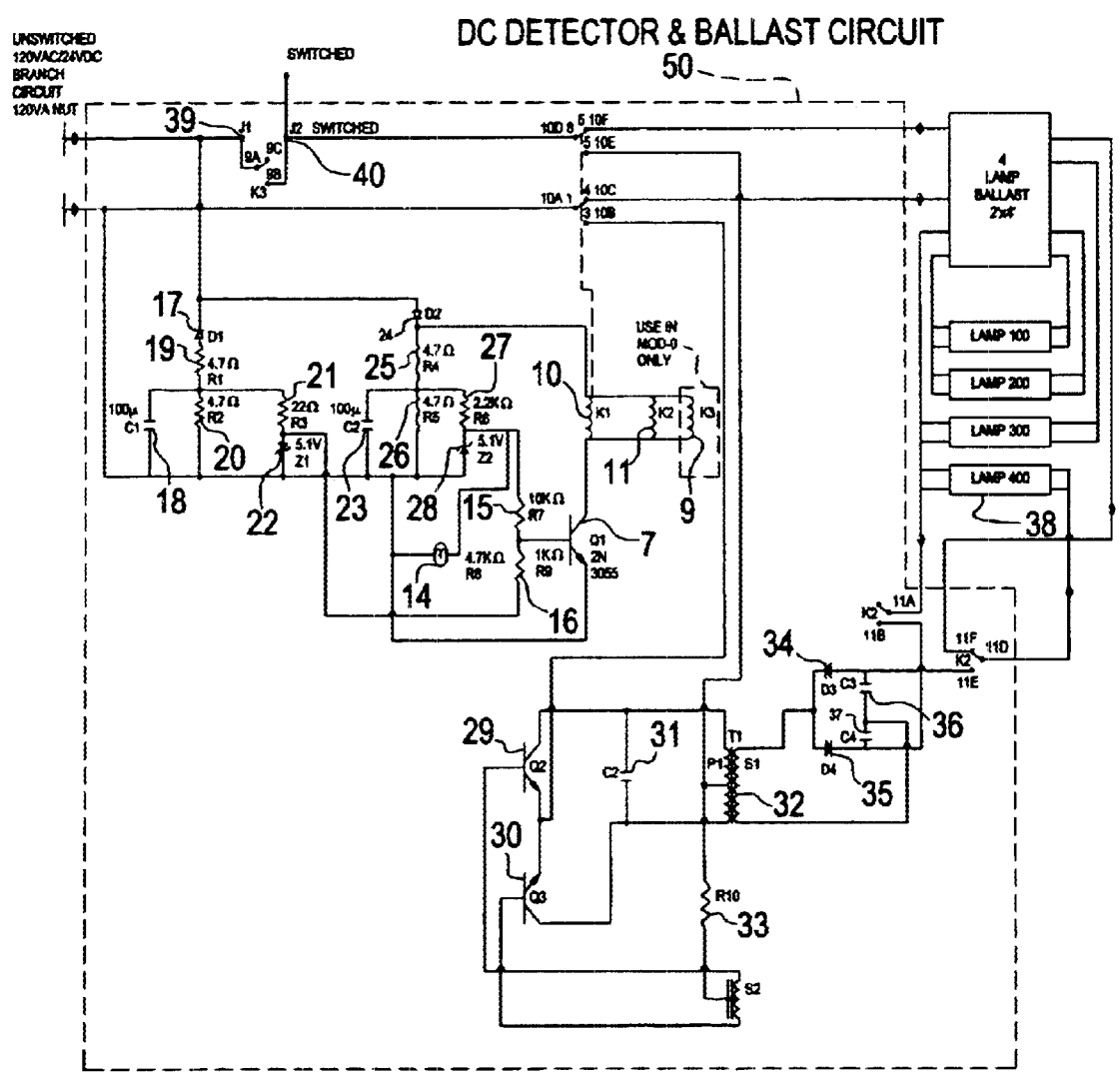
FIG. 3 is a detailed schematics of the illustrative embodiment of the invention.

FIG. 1a depicts a block diagram of an exemplary embodiment of the invention wired into a typical lighting branch circuit. As shown, a branch circuit with a line switch feeding a series of four standard fluorescent fixtures 100, 200, 300 and 400. FIGS. 1b and 1c depict two separate embodiments of the invention. In FIG. 1b, a ballast 13 and a DC detector and ballast (mod-0) 4 are shown electrically connected to a standard fluorescent fixture 100 and having a branch switch K3 terminating at the fluorescent fixture 100. In FIG. 1c, the ballast 13 DC detector is shown with a ballast (mod-1) 41 electrically connected to the standard fluorescent fixtures 200, 300 and 400, however, without a branch switch K3. As shown in FIG. 3, the DC detector and ballast (mod-0) 4 differs from the DC detector and ballast (mod-1) 41 due to it having a relay 9 removed and a jumper wire installed between a first junction (J1) 39 and a second junction (J2) 40.

Figure 2:
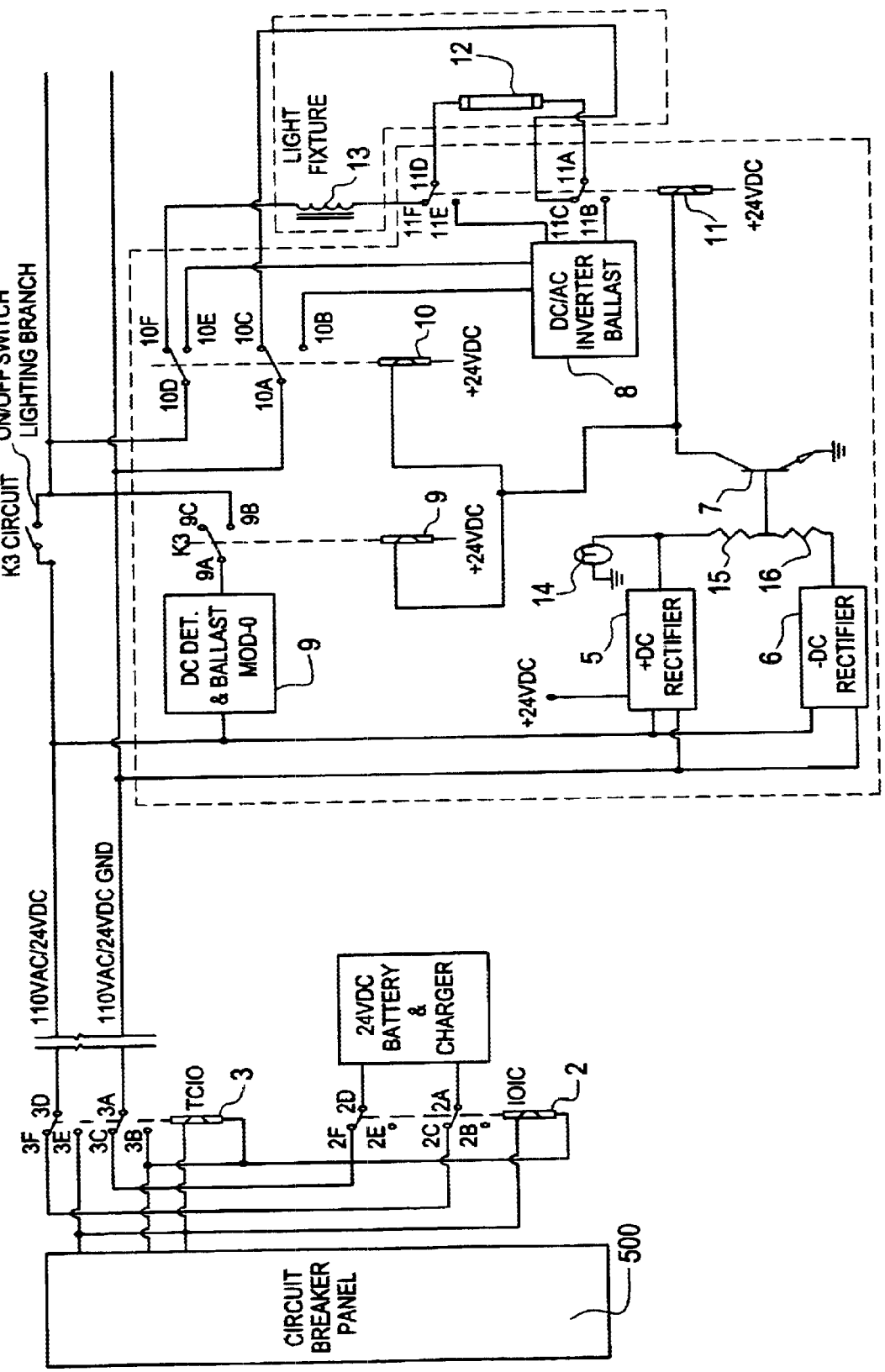
FIG. 2 is a block diagram illustrating the logic and switching of circuit diagram illustrated in FIG. 1a, 1b or 1c.

FIG. 2 depicts a block diagram of an illustrative embodiment of the invention. During the loss of main power (for example, 110V (AC)), power relays 2, 3 de-energize so that an emergency power of 24V from a DC battery 51 is provided to the lighting branch circuit K3 through the normally closed contact of power relay 2 contacts 2a–2b, 2c–2d and normally closed contacts of power relay 3 contacts 3a–3c, 3d–3f. In a normal state, 110V (AC), 60 Hz power is provided to the light branch circuit K3 through the normally open contact of power relay 3 contacts 3a–3b, 3d–3e while power relay 3 is energized. As shown in FIG. 2, an event causing the interruption of power from the main power source causes the de-energizing of the relays 2, 3 so that emergency power is activated from the emergency power source to thereby supply 24V (DC) to the light branch circuit K3 through normally closed contacts 2a–2c, 2d–2f, 3a–3c and 3d–3f of relays 2, 3 respectively.

Power relay 3 is a timed closed instant open (TCIO) relay provided to ensure that the DC circuitry in mod-0 and mod-1 is stabilized before restoring main power of 110V (AC), 60 Hz back to the lighting branch circuit. Power relay 2 is an instant open instant closed (IOIC) relay, and is provided for removing the standby or emergency power of 24V (DC) from the emergency battery source 51 when main power of 110V (AC), 60 Hz is restored. When main power is restored, the branch light circuit K3 loses all power for the time it takes the power relay 3 to energize. This time period is designed to give relays in the DC detector and ballast circuit 4, 41 time to stabilize and also to ensure that no contact bounce occurs when main power is returned to the lighting branch circuit K3.

The DC detector and ballast 9 illustrated in FIG. 2 is designed to monitor the lighting branch circuit and detect when emergency power of 24V (DC) is present, and thereby switches the emergency power of 24V (DC) to a DC/AC inverter ballast circuit 8, which, in turn, drives a light fixture 12, such as a 40 W fluorescent lamp. When the DC detector and ballast 9 detects emergency power of 24V (DC), a relay 11 energizes and interrupts the normal feed to lamp 12 from the standard ballast 13, through relay contacts 11a–11c and 11d–11f, and supplies lamp 12 with the inverter ballast 8 output of main power (120V (AC), 20 KHz) through relay contacts 11a–11b and 11d–11e. Preferably, the DC detector and ballast 9 comprises a positive half wave rectifier 5, a negative half wave rectifier 6, and a voltage divider network including resistors 15, 16, and transistor 7.

As shown in FIG. 2, when the DC detector and ballast 9 detects a power amount from the main power source, such as 110V (AC), the output of each rectifier 5, 6 is equal and opposite in polarity to one another, and the values of resistors 15, 16 are such that the voltage presented at the base of the transistor 7 is held negative, thus, biasing the transistor 7 to an off state. When the lighting branch circuit switches from main power (i.e., 110V (AC), 60 Hz) to the backup or emergency power of 24V (DC), the positive half wave rectifier 5 passes the 24V (DC). In this event, the base of the transistor 7 goes positive and biases the transistor 7 to saturation, drawing current through coils of relays 9, 10 and 11, thereby causing each relay 9, 10 and 11 to energize.

Preferably, relay 9 is only present for mod-0 type DC detector and ballast 4 where a given light fixture has a branch switch circuit K3 coming into the fixture. In accordance with the present invention, the branch lighting circuit switch K3 is bypassed in an off position to provide emergency lighting to the branch lighting circuit if it incorporates an emergency lighting circuit. The possibility exists that a branch lighting circuit may be off, even though that circuit is needed for egress lighting. In such an event and where main power is lost, the designated emergency lighting will automatically energize to provide for egress lighting. In the event of a loss of main power (i.e., 110V AC, 60 Hz), relay 9 energizes when 24V (DC) is detected and, in turn, will close contact 9a–9b. This closure will short the light branch circuits on/off switches and extend the 24V (DC) to the remaining lighting fixtures in the circuit. Relay 10 routes 24V (DC) through normally open contacts 10a–10b and 10d–10e to the inverter ballast upon the loss of main power (i.e., 110V AC, 60 Hz). Upon the presence of main power at the light branch circuit, contact 10a–10c and 10d–10f will route main power (i.e., 110V (AC), 60 Hz) to the input of the standard light fixture ballast. Lamp 14 is a DC lamp illuminated while main power is present and mounted in the fixture of the emergency light to signify that the fixture contains emergency egress lighting.

FIG. 3 illustrates a detailed schematic of an illustrative embodiment of a DC detector and ballast circuit 50 in accordance with the present invention and includes a negative half wave rectifier and filter comprising a diode 17, resistors 19, 20 and filter capacitor 18. A third resistor 21 and a zener diode 22 are provided to establish a negative reference voltage of 5.1V (DC) for comparison to the same components which establishes a positive reference voltage of 5.1V (DC). These components include a diode 24, resistors 25, 26 and a filter capacitor 23. The positive 5.1V DC voltage and the negative 5.1V DC voltage are connected to a voltage dividing network 15, 16. Preferably, the value of network 15 is approximately 2 times the value of that of network 16, and therefore, will drop twice the voltage of network 16. As a result, this maintains the junction of network 15, 16 at a minus 1.83V which, in turn, biases the transistor 7 in the off state. The biasing of the transistor 7 when the lighting branch circuit is supplied with main power (i.e., 110V (AC), 60 Hz) ensures that relays 9, 10 and 11 remain de-energized. Accordingly, the light fixture (fluorescent lamp) is supplied with the standard ballast output through normally closed contacts 11d–11f of relay 11.

At the DC detector and ballast circuit, positive 24V (DC) is present at the cathode of diode 17 and the anode of diode 24, with 24V (DC) return now becoming the circuit ground. At this point, the diode 17 now blocks current flow and the diode 24 will thereby conduct. With the conduction of diode 24, 24V (DC) is coupled to the voltage divider comprising resistors 25, 26, thereby providing 12V (DC) to the voltage reference circuit of the resistor 27 and the zener diode 28. The zener diode 28 maintain a 5.1V (DC) reference at the voltage divider circuit of resistor 15. The other side of the voltage divider resistor 16 no longer has negative 5.1V (DC) with the absence of main power (i.e., 110V (AC), 60 Hz), but the negative half wave rectifier does complete the current path for the voltage divider of resistors 15, 16 through resistors 20, 21. This current flow will put the junction of resistors 15, 16 to a positive voltage and coupled to the base of the transistor 7 will forward bias the transistor 7 to saturation. Upon conduction, the transistor 7 provides ground to relays 9, 10 and 11, causing each relay 9, 10 and 11 to energize. While relay 9 is energized, normally open contacts 9a–9b close, in turn, shorting any on/off switches that might be off keeping power to the lights. The closure of these contacts will route positive 24V (DC) to relay contact 10d of relay 10. Relay 10 also is in the energized state and will route positive 24V (DC) to the inverter ballast circuit through its normally open contact 10d–10e. In addition, 24V (DC) return is coupled to the inverter ballast circuit through the normally open contacts 10a–10b of relay 10.

The inverter circuit is designated to convert 24V (DC) to a high voltage AC signal at approximately 20 KHz. The voltage level and frequency are selected to be compatible with several fluorescent lamp types. Transistors 29, 30 begin conducting when 24V (DC) is applied through relay 10. Since there can never be a perfect balance one will conduct harder than the other. As the dominant transistor conducts toward saturation, the feedback winding of transformer 32 at secondary winding S2 aides the harder conducting transistor and at the same time bias the other off. This continues until transformer 32 primary P1 saturates and no more magnetic flux coupling occurs in transformer 32. At this point, base current stops flowing, thereby negating conduction of the conducting transistor. Current stops flowing to the transformer 32 primary P1 and the magnetic field collapses causing current reversal in secondary S2. The current of opposite polarity will bias the transistor that was bias off first in the forward direction. At this time, the same action occurs with this transistor turning on to saturation and biasing the opposite transistor to cut off. This transition repeats and sets up a square wave oscillation at a frequency determined by the transformer values and transistor operating characteristics. Capacitor 31 is to reduce transformer ringing when push pull transistor is switched on and off.

The secondary S1 winding of transformer 32 is stepped up from the primary P1 to produce the desired voltage needed to start and operate the selected fluorescent lamp. Coupled to the secondary winding S1 of transformer 32 is an impedance matching circuit consisting of diodes 34, 35 and capacitors 36, 37. The lamp drive voltage from transformer 32 secondary S1 is coupled to fluorescent lamp 4, 38 through diode 34 and normally open contacts 11e–11d of relay 11 and through diode 34 and normally open contacts 11a–11b of relay 11.

It will be apparent that any modifications and variations may be effected without departing from the spirit and scope of the novel concepts set forth in the present invention.

What is claimed is:

1. An emergency lighting system for operating a plurality of light fixtures during at least one of a normal operation and an emergency operation, said emergency lighting system comprising:

branch circuit means for distributing power to the light fixtures;

power supply means for supplying power to the light fixtures, said power supply means being placed in electronic communication with the light fixtures through said branch circuit means;

auxiliary power supply means for supplying auxiliary power to the light fixtures, said auxiliary power supply means being placed in electronic communication with the light fixtures through said branch circuit means;

detection means in electronic communication with said power supply means and said auxiliary power supply means for detecting an occurrence of a power interruption in said power supply means;

wherein said detection means comprises a DC detector and ballast;

switching means for selectively switching power from said power supply means to said auxiliary power supply means in response to a detection of a power interruption in said power supply means, wherein said switching means includes a bypass mechanism in electronic communication with said power supply means and said auxiliary power supply means for energizing the plurality of light fixtures to thereby permit transmission of power from said auxiliary power supply means to the plurality of light fixtures regardless of an on/off switch position of the plurality of light fixtures.

2. The emergency lighting system of claim 1, wherein said power supply means comprises an AC power source.

3. The emergency lighting system of claim 2, wherein said auxiliary power supply means comprises a DC power source.

4. The emergency lightning system of claim 1, further comprising power relay circuitry for directing power from said power supply means and said auxiliary power supply means to the plurality of light fixtures in response to a detection of power interruption in said main power source.

5. The emergency lighting system of claim 4, wherein said power relay circuitry includes a first power relay circuit for permitting stabilization of DC circuitry in said auxiliary power supply means prior to restoration of power from said power supply means.

6. The emergency lighting system of claim 5, wherein said first power relay comprises a timed closed instant open relay.

7. The emergency lighting system of claim 6, wherein said power relay circuitry includes a second power relay circuit for selectively removing auxiliary power from said auxiliary power supply means when power from said power supply means is restored.

8. The emergency lighting system of claim 7, wherein said second power relay comprises an instant open instant closed relay.

9. The emergency lighting system of claim 1, wherein said DC detector and ballast comprises power supply means comprises a positive half wave rectifier, a negative half wave rectifier and a voltage divider network.

10. An emergency lighting system for operating a plurality of light fixtures during at least one of a normal operation and an emergency operation, said emergency lighting system comprising:
   a plurality of branch circuits for distributing power to the light fixtures;
   a power supply source for the light fixtures, said power supply source being placed in electronic communication with the light fixtures through said branch circuits;
   an auxiliary power supply source for the light fixtures, said auxiliary power supply source being placed in electronic communication with the light fixtures through said branch circuits;
   a detection mechanism in electronic communication with said power supply source and said auxiliary power supply source for detecting a power interruption in said power supply source;
   wherein said detection mechanism comprises a DC detector and ballast;
   a switching mechanism for selectively switching power from said power supply source to said auxiliary power supply source in response to the detection of a power interruption in said power supply source by said detection mechanism; and
   power relay circuit for directing power from said power supply source and said auxiliary power supply source to the plurality of light fixtures,
   wherein said power relay circuitry comprises a first power relay circuit in electronic communication with said power supply source and said auxiliary power supply source for permitting stabilization of DC circuitry in said auxiliary power supply source prior to of power from said power supply source.

11. The emergency lighting system of claim 10, wherein said power supply source comprises an AC power source.

12. The emergency lighting system of claim 11, wherein said auxiliary power supply source comprises a DC power source.

13. The emergency lighting system of claim 10, wherein said first power relay circuit comprises a timed closed instant open relay.

14. The emergency lighting system of claim 13, wherein said power relay circuitry comprises a second power relay circuit for selectively removing power from said auxiliary power supply source when power from said power supply source is restored.

15. The emergency lighting system of claim 14, wherein said second power relay circuit comprises an instant open instant closed relay.

16. The emergency lighting system of claim 10, wherein said DC detector and ballast comprises a positive half wave rectifier, a negative half wave rectifier and a voltage divider network.

17. The emergency lighting system of claim 10, wherein said switching mechanism includes a switch bypass device for energizing the plurality of light fixtures to thereby permit transmission of power from said auxiliary power supply source to the plurality of fixtures regardless of an on/off switch position of the plurality of light fixtures.

18. An lighting system for operating a plurality of light fixtures during at least one of a normal operation and an emergency operation, said emergency lighting system comprising:
   branch circuitry for distributing power to the light fixtures;
   an AC power supply source for the light fixtures, said AC power supply source being placed in electronic communication with the light fixtures through said branch circuitry;
   a DC power supply source for the light fixtures, said DC power supply source being placed in electronic communication with the light fixtures through said branch circuitry;
   a detection mechanism in electronic communication with said AC power supply source and said DC power supply source for said AC power supply source;
   wherein said detection mechanism comprises a DC detector and ballast; and
   a switching mechanism for selectively switching power from said AC power supply source to said DC power supply source in response to a detection of a power interruption in said power supply source by said detection mechanism, and
   wherein said switching mechanism includes a bypass mechanism in electronic communication with said AC power supply source and said DC power supply source for energizing the plurality of light fixtures and thereby permit transmission of power from said DC power supply source to the plurality of light fixtures regardless of an on/off switch position of the plurality of light fixtures.

19. The emergency lighting system of claim 18, further comprising power relay circuitry in electronic communication with said power supply source and said auxiliary power supply source for directing power from said AC power supply source and said DC power supply source to the plurality of light fixtures in response to a detection of power interruption in said AC power source.

20. The emergency lighting system of claim 19, wherein said power relay circuitry comprises a first power relay circuit for permitting stabilization of DC circuitry in said auxiliary power supply source prior to restoration of main power from said power supply source.

21. The emergency lighting system of claim 20, wherein said first power relay circuit comprises a timed closed instant open relay.

22. The emergency lighting system of claim 21, wherein said power relay circuitry comprises a second power relay circuit for selectively removing power from said DC power supply source when power from said AC power supply source is restored.

23. The emergency lighting system of claim 22, wherein said second power relay circuit comprises an instant open instant closed relay.

24. The emergency lighting system of claim 12, wherein said DC detector and ballast comprises a positive half wave rectifier, a negative half wave rectifier and a voltage divider network.

* * * * *